US005767701A

United States Patent [19]
Choy et al.

[11] Patent Number: 5,767,701
[45] Date of Patent: Jun. 16, 1998

[54] SYNCHRONOUS CONTENTION PREVENTION LOGIC FOR BI-DIRECTIONAL SIGNALS

[75] Inventors: Garrett Choy, San Jose; W. Alfred Graf, III, Saratoga, both of Calif.

[73] Assignee: Cypress Semiconductor Corp., San Jose, Calif.

[21] Appl. No.: 672,730

[22] Filed: Jun. 28, 1996

[51] Int. Cl.$^6$ ............... H03K 19/0175; G06F 13/20
[52] U.S. Cl. ................ 326/93; 326/26; 326/37; 326/82; 395/728
[58] Field of Search ............... 326/93, 82, 86, 326/90, 56, 105, 26, 28, 46, 37; 327/407; 370/447; 395/728

[56] References Cited

U.S. PATENT DOCUMENTS

| | | | |
|---|---|---|---|
| 4,870,302 | 9/1989 | Freeman | 326/41 |
| 4,987,319 | 1/1991 | Kawana | |
| 5,086,427 | 2/1992 | Whittaker et al. | 370/462 |
| 5,136,185 | 8/1992 | Fleming et al. | |
| 5,248,908 | 9/1993 | Kimura | 326/86 |
| 5,251,305 | 10/1993 | Murphy, Jr. et al. | 395/556 |
| 5,394,034 | 2/1995 | Becker et al. | 326/39 |
| 5,424,982 | 6/1995 | Kato | 365/189.05 |
| 5,646,553 | 7/1997 | Mitchell et al. | 326/93 |
| 5,648,733 | 7/1997 | Worrell et al. | 326/86 |

*Primary Examiner*—Jon Santamauro
*Attorney, Agent, or Firm*—Blakely, Sokoloff, Taylor & Zafman LLP

[57] ABSTRACT

A synchronous contention prevention circuit for a bi-directional bus. The synchronous contention prevention circuit comprises a synchronous anticontention circuit coupled to a first input/output circuit. The synchronous anticontention circuit receives a driver select signal and a clock signal. The first input/output circuit has a first input coupled to the synchronous anticontention circuit and a first output. When the driver select signal is in a first logic state, the first input/output circuit is disabled from driving the first output. Subsequently, the driver select signal transitions from the first logic state to a second logic state. After the driver select signal transition to the second logic state, the synchronous anticontention circuit generates a first signal in response to a first transition of the clock signal. The synchronous anticontention circuit then generates a second signal in response to the first signal and a second transition of the clock signal. The second signal enables the first input/output circuit to drive the first output. The first output may be coupled to a bi-directional bus.

23 Claims, 7 Drawing Sheets

SYNCHRONOUS CONTENTION PREVENTION LOGIC FOR BI-DIRECTIONAL SIGNALS

CROSS-REFERENCE TO RELATED APPLICATIONS

This application is related to subject matter in copending U.S. patent application Ser. No. 08/672,723, filed concurrently with this application on Jun. 28, 1996, entitled "ASYNCHRONOUS ANTICONTENTION LOGIC FOR BI-DIRECTIONAL SIGNALS," and incorporated herein by reference in its entirety.

BACKGROUND OF THE INVENTION

1. Field of the Invention

The present invention relates to bi-directional signal communication. More particularly, the present invention relates to preventing contention of bi-directional signals on a bi-directional bus.

2. Discussion of the Background

When two devices (integrated circuits, systems, etc.) are coupled to a bi-directional bus, some means of arbitration must be employed so that the devices do not simultaneously drive data onto the bi-directional bus. If both devices simultaneously drive the bi-directional bus, then bus contention occurs. Bus contention corrupts the data driven by the contending devices.

One method of preventing bus contention between two devices has been to use handshaking signals to communicate between the devices. In a typical example, a first device has control of the bi-directional bus and a second device desires to drive data on the bus. The second device sends a "bus request signal" to the first device. When the first device has completed driving its data on the bi-directional bus, the first device sends an "acknowledge signal" to the second device. The first device then releases the bi-directional bus for use by the second device. The second device receives the acknowledge signal and then can drive data onto the bus.

One disadvantage of the handshaking method is the latency involved, that is, it requires many clock cycles in order to successfully arbitrate between the devices for control of the bi-directional bus. Before the second device can drive the bus, it must first alert the first device of its intention to take control of the bus. The second device must then wait for the acknowledge signal to arrive before it can drive the bi-directional bus.

Another disadvantage of the handshaking method is the amount of logic and circuitry typically used to perform the handshaking communication. Both the first device and the second device must incorporate circuitry to generate and process the handshaking signals. Furthermore, the state machine controllers of each of the devices must contain sufficient logic and additional states to control the handshaking communication.

Another disadvantage of the handshaking method is that it can require as many as four additional pins on each device to communicate the request and acknowledge signals between the two devices. For example, each device may require two output pins to output request and acknowledge signals, and an additional two input pins to receive request and acknowledge signals.

It is believed that another method for preventing bus contention between devices has been to incorporate an anticontention logic function into the system state machine controller. The system state machine controller typically resides in one of the two devices. The system state machine controller controls the overall function of a device. By incorporating the arbitration function into the system state machine controller, the system state machine controller can decide which device has access to the bus and when access may occur.

One disadvantage of incorporating the arbitration circuitry and logic into the system state machine controller is that it adds additional complexity (e.g. a greater number of states) to the system state machine controller. Moreover, additional machine cycles are consumed in performing the arbitration function. Furthermore, extra time may be required to determine if and how the system state machine controller will prevent bus contention. In addition, the speed of the bi-directional data transfer may be reduced, resulting in the introduction of performance-dampening "wait states" in the system.

Another disadvantage of incorporating the arbitration circuitry and logic into the system state machine controller is that the arbitration circuitry and logic are typically not modular. Modularity increases system performance by removing tasks from the system state machine controller which can be performed by separate pieces of circuitry. Moreover, incorporating the arbitration circuitry and logic into the system state machine controller complicates later modifications to the system state machine controller. Thus, later modifications to the system state machine controller can inadvertently disrupt the ability of the system state machine controller to prevent bus contention.

Therefore, it is desirable to have a method and apparatus for preventing contention between two or more devices on a bi-directional bus that: (a) utilizes a small number of device pins and circuitry; (b) performs the arbitration function in a few number of clock cycles and preferably without the introduction of wait states into the system; (c) may be modular and thus separate and/or independent from the system state machine; (d) does not unnecessarily complicate the system state machine; and (e) performs the anticontention function in a synchronous fashion.

SUMMARY OF THE INVENTION

The present invention concerns a synchronous contention prevention circuit for a bi-directional bus. The synchronous contention prevention circuit comprises a synchronous anticontention circuit coupled to a first input/output circuit. The synchronous anticontention circuit receives a driver select signal and a clock signal. The first input/output circuit has a first input coupled to the synchronous anticontention circuit and a first output. When the driver select signal is in a first logic state, the first input/output circuit is disabled from driving the first output. Subsequently, the driver select signal transitions from the first logic state to a second logic state. After the driver select signal transitions to the second logic state, the synchronous anticontention circuit generates a first signal in response to a first transition of the clock signal. The synchronous anticontention circuit then generates a second signal in response to the first signal and a second transition of the clock signal. The second signal enables the first input/output circuit to drive the first output. The first output may be coupled to a bi-directional bus.

The present invention also concerns a method of synchronously preventing contention on a bi-directional bus comprising the steps of: disabling a first input/output circuit from driving a bi-directional bus in response to a first driver select signal and a first transition of a clock signal; and enabling a second input/output circuit to drive the bi-directional bus in response to a second transition of the clock signal. The method may also comprise the steps of: disabling the second input/output circuit from driving the bi-directional bus in response to a second driver select signal and a third transition of the clock signal; and enabling the first input/output circuit to drive the bi-directional bus in response to a fourth transition of the clock signal.

Other features and advantages of the present invention will be apparent from the accompanying drawings and from the detailed description that follows.

BRIEF DESCRIPTION OF THE DRAWINGS

The features and advantages of the present invention are illustrated by way of example and are by no means intended to limit the scope of the present invention to the particular embodiments shown.

DETAILED DESCRIPTION

A synchronous contention prevention circuit for bi-directional signals is described. In the following description, for purposes of explanation, specific nomenclature is set forth to provide a thorough understanding of the present invention. However, it will be apparent to one skilled in the art that these specific details are not required to practice the present invention. In other instances, well known circuits and devices are shown in block diagram form to avoid obscuring the present invention unnecessarily.

Figure 1:
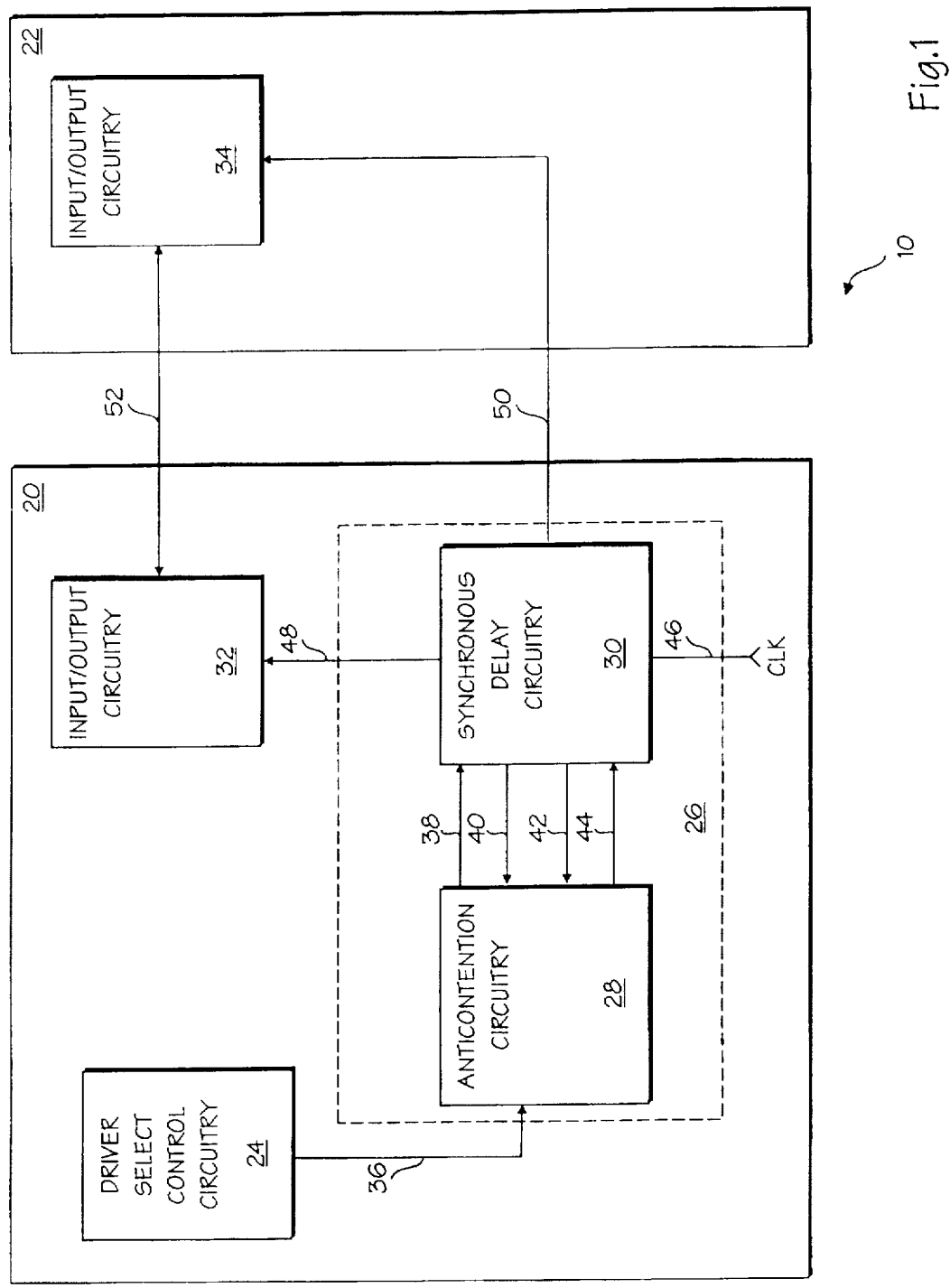
FIG. 1 is a block diagram of one embodiment of the present invention.

FIG. 1 shows a system 10 comprising first device 20 and second device 22 coupled to bi-directional bus 52. First device 20 and second device 22 may comprise integrated circuits, discrete circuits, or systems. For one embodiment, first device 20 and second device 22 each comprise programmable logic devices and bus 52 is part of a PCI bus. For another embodiment, first device 20, second device 22, and bi-directional bus 52 are included in a single device.

First device 20 includes synchronous anticontention circuitry 26 coupled to driver select control circuitry 24 and input/output circuitry 32. Second device 22 includes input/output circuitry 34. Synchronous anticontention circuitry 26 is coupled to input/output circuitry 34 via line 50. Synchronous anticontention circuitry 26, input/output circuitry 32, and input/output circuitry 34 comprise synchronous contention prevention circuitry for bi-directional bus 52.

Input/output circuitry 32 and input/output circuitry 34 are coupled to bi-directional bus 52. Bi-directional bus 52 may comprise a single bi-directional line or a plurality of bi-directional lines.

As illustrated in FIG. 1, first device 20 requires only one output and second device 22 requires only one input in order to implement bus arbitration. The one output of first device 20 outputs a bus control signal on line 50. The one input of second device 22 receives the bus control signal on line 50.

Driver select control circuitry 24 comprises control circuitry that determines whether first device 20 or second device 22 should control or drive data onto bi-directional bus 52. For one embodiment, driver select control circuitry 24 may be part of a system state machine controller for system 10 or a state machine controller of first device 20. For an alternative embodiment, driver select control circuitry 24 may be circuitry which communicates with the system state machine controller or the state machine controller of first device 20.

Driver select control circuitry 24 generates a driver select signal and couples the driver select signal to synchronous anticontention circuitry 26 via line 36. The driver select signal indicates whether first device 20 or second device 22 may drive data onto bi-directional bus 52. For example, when the driver select signal is in a first logic state (e.g. low) synchronous anticontention circuitry 26 sends a signal on line 50 to input/output circuitry 34 which enables input/output circuitry 34 to drive data onto bi-directional bus 52. Similarly, when the driver select signal is in a second logic state (e.g. high) synchronous anticontention circuitry 26 sends a signal on line 48 to input/output circuitry 32 which enables input/output circuitry 32 to drive data onto bi-directional bus 52. The signals on lines 48 and 50 will ensure that only one of input/output circuitry 32 or input/output circuitry 34 will be able to drive data onto bi-directional bus 52 at any given time.

Synchronous anticontention circuitry 26 is modular or self-timing, that is, synchronous anticontention circuit 26 is not part of the system state machine or the state machine of device 20; rather, it receives the driver select signal from driver select control circuitry 24 and then performs the steps necessary to prevent contention on bi-directional bus 52. Therefore, the system state machine does not have to perform arbitration and the system state machine is not further complicated. Additionally, there is a very low probability that changes in the system state machine will affect the driver select signal. Thus, there is a very low probability that changes in the system state machine will cause the arbitration performed by synchronous anticontention circuitry 26 to be inadvertently altered.

Synchronous anticontention circuitry 26 comprises anticontention circuitry 28 coupled to synchronous delay circuitry 30 via lines 38, 40, 42, and 44. Synchronous delay circuitry 30 is coupled to input/output circuitry 32 via line 48. Additionally, synchronous delay circuitry 30 is coupled to input/output circuitry 34 via line 50. Anticontention circuitry 28 and synchronous delay circuitry 30 function together to enable and disable input/output circuitry 32 and input/output circuitry 34 so that there is no contention on bi-directional bus 52.

Synchronous anticontention circuitry 26 prevents contention on bi-directional bus 52 as follows. Assume that driver select control circuitry 24 has generated a driver select signal line on line 36 having a first logic state for a period of time so that input/output circuitry 34 controls bi-directional bus 52. At a later point in time, driver select control circuitry 24 determines that input/output circuitry 32 should have access to and drive data on bi-directional bus 52. Therefore, synchronous anticontention circuitry 26 must first disable input/output circuitry 34 from driving data on bi-directional bus 52, then enable input/output circuitry 32 to drive data onto bi-directional bus 52.

Driver select control circuitry 24 transitions the driver select signal on line 36 to a second logic state. Anticontention circuitry 28 then generates a signal on line 44. In response to a first transition of a clock signal CLK on line 46 and the signal on line 44, synchronous delay circuitry 30 sends a signal on line 50 to input/output circuitry 34 that disables input/output circuitry 34 from driving data onto bi-directional bus 52. CLK may be generated by a clock source internal to first device 20, or by a clock source external to first device 20.

It will take a certain amount of time due to an intrinsic delay of system 10 for the signal generated by synchronous delay circuitry 30 to travel across line 50 and to disable input/output circuitry 34 from driving data onto bi-directional bus 52. The intrinsic delay includes the signal speed on line 50, drive capability of synchronous delay circuitry 30, loading on line 50, time required for the signal on line 50 to travel from the input of second device 22 to input/output circuitry 34, time required to disable input/output circuitry 34 from driving bi-directional bus 52, and time required to enable input/output 34 to receive data from bi-directional bus 52.

When input/output circuitry 34 has been disabled from driving data onto bi-directional bus 52, neither input/output circuitry 32 nor input/output circuitry 34 drives data onto bi-directional bus 52. Synchronous delay circuitry 30 then generates a signal on line 42. For one embodiment, the signal on line 42 is the signal on line 50. For another embodiment, logic and circuit elements within synchronous delay circuitry 30 may generate the signal on line 42 in response to the signal on line 50 and the clock signal on line 46.

Anticontention circuitry 28 generates a signal on line 38 in response to the signal on line 42 and the driver select signal on line 36. In response to a second transition of CLK on line 46, synchronous delay circuitry 30 generates a signal on line 48 that enables input/output circuitry 32 to drive data onto bi-directional bus 52.

It will be appreciated that the time between the first and second transitions of CLK is greater than the intrinsic delay of system 10. Therefore, bus contention on bi-directional bus 52 will be avoided since input/output circuitry 32 will not be enabled to drive bi-directional bus 52 until input/output circuitry 34 is disabled from driving bi-directional bus 52.

When driver select control circuitry determines that input/output circuitry 34 should again drive data onto bi-directional bus 52, driver select control circuitry 24 transitions the driver select signal on line 36 from the second logic state to the first logic state. Anticontention circuitry 28 then generates a signal on line 38. In response to a first transition of a clock signal CLK on line 46 and the signal on line 38, synchronous delay circuitry 30 sends a signal on line 48 to input/output circuitry 32 that disables input/output circuitry 32 from driving data onto bi-directional bus 52.

When input/output circuitry 32 has been disabled from driving data onto bi-directional bus 34, neither input/output circuitry 32 nor input/output circuitry 34 drives data onto bi-directional bus 52. Synchronous delay circuitry 30 then generates a signal on line 40. For one embodiment, the signal on line 40 is the signal on line 48. For another embodiment, logic and circuit elements within synchronous delay circuitry 30 may generate the signal on line 40 in response to the signal on line 38 and the clock signal on line 46.

Anticontention circuitry 28 generates a signal on line 44 in response to the signal on line 40 and the driver select signal on line 36. In response to a second transition of CLK on line 46, synchronous delay circuitry 30 generates a signal on line 50 that enables input/output circuitry 34 to drive data onto bi-directional bus 52.

It will be appreciated by one skilled in the art that the function of lines 38 and 44 are interchangeable. Similarly, the function of lines 40 and 42 are interchangeable.

Figure 2:
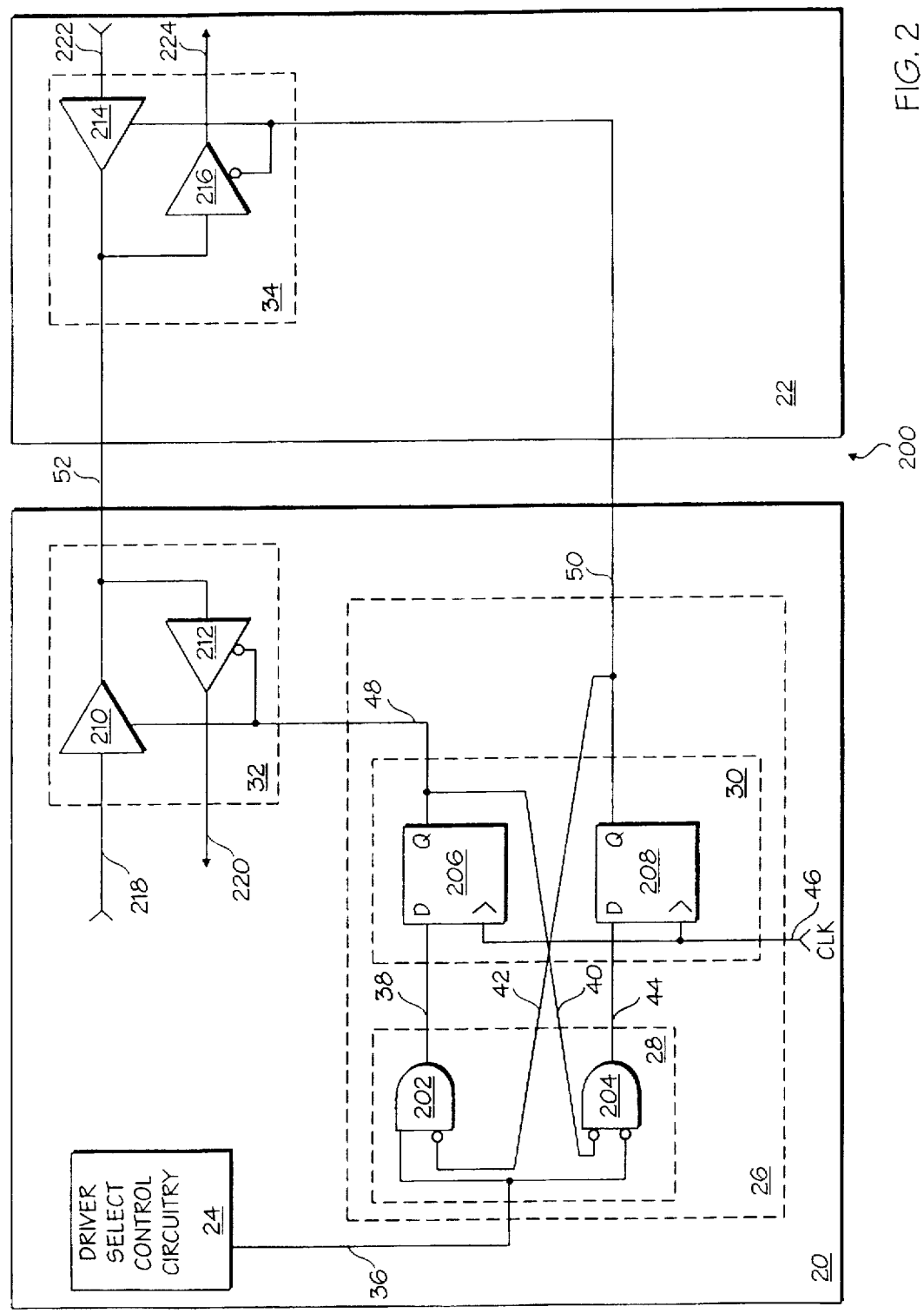
FIG. 2 is a circuit diagram of another embodiment of the present invention.

FIG. 2 illustrates system 200 which is one embodiment of system 10 illustrated in FIG. 1. Anticontention circuitry 28 comprises two AND gates 202 and 204. Synchronous delay circuitry 30 comprises two registers 206 and 208. The active high input of AND gate 202 is coupled to line 36 and the active low input of AND gate 202 is coupled to the Q output of register 208 on line 50. The output of AND gate 202 is coupled to the D input of register 206 via line 38. In this embodiment, line 50 is directly coupled to line 42.

One of the active low inputs of AND gate 204 is coupled to line 36 and the other active low input is coupled to the Q output of register 206 on line 48. In this embodiment, line 48 is directly coupled to line 40. The output of AND gate 204 is coupled to the D input of register 208 via line 44. The clock inputs of registers 206 and 208 are coupled to clock signal CLK on line 46. It will be appreciated that AND gate 204 is configured as the equivalent of a NOR gate.

Input/output circuitry 32 comprises driver 210 and receiver 212. When the signal on line 48 is a high logic state driver 210 is enabled and receiver 212 is disabled. When enabled, driver 210 receives an internal signal from first device 20 on line 218 and drives the internal signal onto bi-directional bus 52. When the signal on line 48 is a low logic state, receiver 212 is enabled and driver 210 is disabled. When enabled, receiver 212 receives a signal from bi-directional bus 52 (from input/output circuitry 34) and couples the signal to line 220 for use by first device 20.

Similarly, input/output circuitry 34 comprises driver 214 and receiver 216. When the signal on line 50 is a high logic state driver 214 is enabled and receiver 216 is disabled. When enabled, driver 214 receives an internal signal from second device 22 on line 222 and drives the internal signal onto bi-directional bus 52. When the signal on line 50 is a low logic state, receiver 216 is enabled and driver 214 is disabled. When enabled, receiver 216 receives a signal from bi-directional bus 52 (from input/output circuitry 32) and couples the signal to line 224 for use by second device 22.

It will be appreciated that input/output circuitry 32 and input/output circuitry 34 may each comprise more than one set of drivers and receivers coupled to lines 48 and 50, respectively, to drive a plurality of bus lines. Additionally, the logic states on lines 48 and 50 for enabling and disabling drivers 210 and 214 and receivers 212 and 216 may be altered as generally known in the art.

Figure 3:
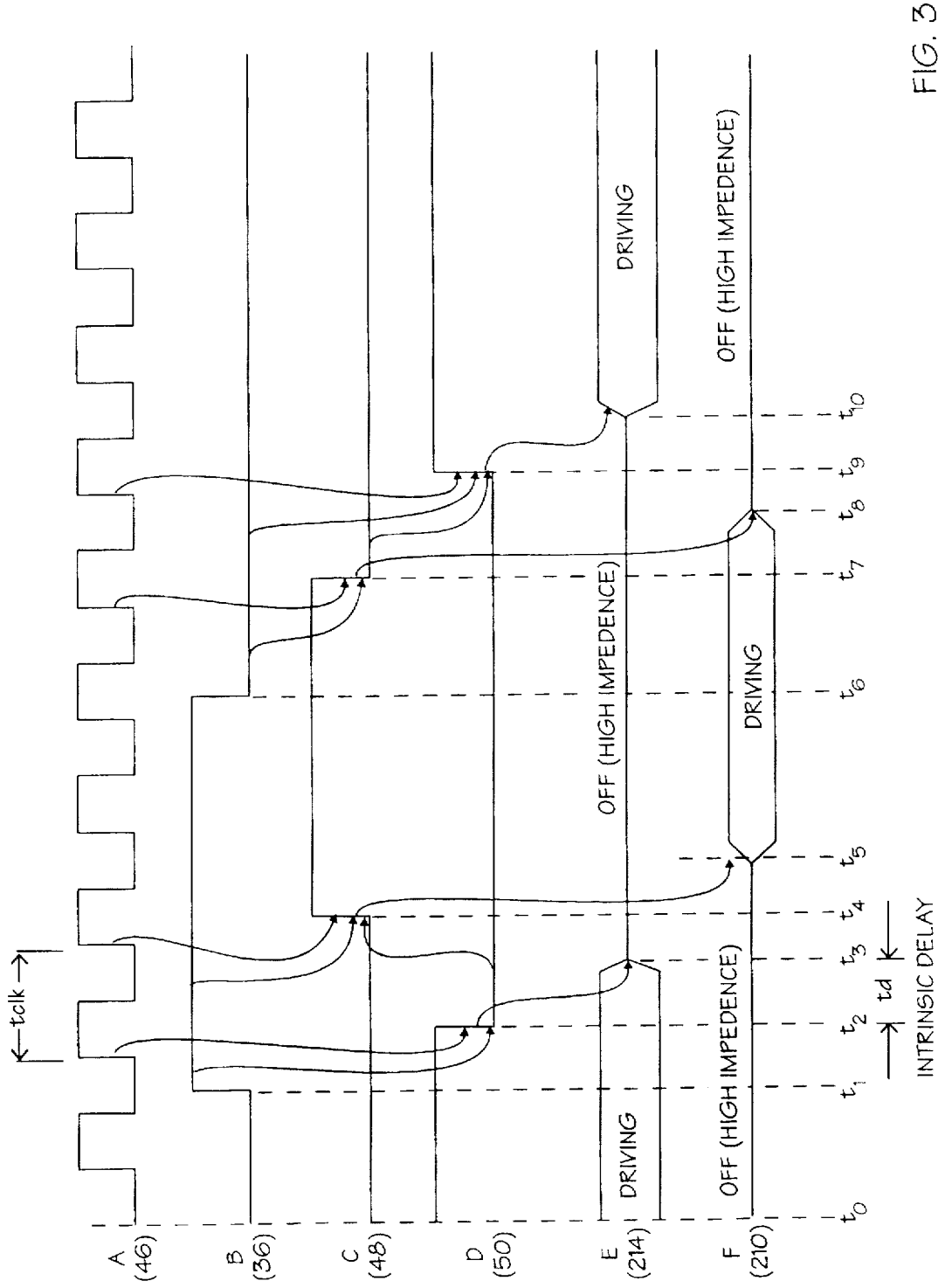
FIG. 3 is a timing waveform diagram for the embodiment of the present invention illustrated in FIG. 2.

The operation of the circuitry illustrated in FIG. 2 will be described with the aide of the illustrative timing waveform diagram shown in FIG. 3. In FIG. 3, waveform A corresponds to the signal on line 46, waveform B corresponds to the driver select signal on line 36, waveform C corresponds to the signal on line 48, waveform D corresponds to the signal on line 50, waveform E corresponds to the output waveform of driver 214 driving bi-directional bus 52 (high and low levels indicate driver 214 is driving data onto bi-directional bus 52, and an intermediate level represented by a solid single line indicates that driver 214 is not driving bi-directional bus 52 and is in a high impedance state), and waveform F corresponds to the output waveform of driver 210 driving bi-directional bus 52 (high and low levels indicate driver 210 is driving data onto bi-directional bus 52, and an intermediate level represented by a solid single line indicates that driver 210 is not driving bi-directional bus 52 and is in a high impedance state).

At time t0, the driver select signal on line 36 is in a low logic state, the signals on lines 38 and 48 are low (inactive), the signals on lines 44 and 50 are high (active), input/output circuitry 34 is enabled to drive data onto bi-directional bus 52, and input/output circuitry 32 is disabled from driving data onto bi-directional bus 52.

At some point in time after time t0, driver select control circuitry 24 will communicate to synchronous anticontention circuitry 26 that input/output circuitry 32 should have control of bi-directional bus 52. At time t1, driver select control circuitry 24 transitions the driver select signal on line 36 to a high logic state. This will cause the signal on line 44 to transition from a high logic state to a low logic state (not shown). On the next rising edge transition of CLK, register 208 will cause the signal on line 50 to transition to a low logic state or become inactive at time t2.

After the signal on line 50 has transitioned to a low logic state at time t2, driver 214 will be disabled from driving data onto bi-directional bus 52 at time t3. The difference between times t2 and t3 includes the intrinsic delay $t_d$ of system 200. The intrinsic delay of system 200 includes the time required for the signal on line 50 to travel from the Q output of register 208 to input/output circuitry 34, the time required to disable driver 214 from driving bi-directional bus 52, and time required to enable receiver 216 to receive data from bi-directional bus 52.

When the signal on line 50 transitions to a low logic state, AND gate 202 transitions the signal on line 38 to a high logic state. On the next rising edge of CLK on line 46, register 206 will cause the signal on line 48 to transition to a high logic state or become active at time t4. At time t5, driver 210 will then be enabled to drive bi-directional bus 52. The time difference between times t4 and t5 includes the time required for the signal on line 48 to travel to driver 210 and receiver 212, time required to enable driver 210, and time required to disable receiver 212.

From time t1 to time t5 synchronous anticontention circuitry 26 transitions control of bi-directional bus 52 from second device 22 to first device 20 while preventing bus contention between input/output circuitry 34 and input/output circuitry 32. One of ordinary skill in the art will appreciate that the clock period $t_{CLK}$ must be greater than the intrinsic delay $t_d$ of system 200.

As further illustrated in FIG. 3, synchronous anticontention circuitry 26 transitions control of bi-directional bus 52 from first device 20 back to second device 22 at time t6 through time t10.

At time t6, driver select control circuitry 24 transitions the driver select signal on line 36 to a low logic state. This will cause the signal on line 38 to transition from a high logic state to a low logic state (not shown). On the next rising edge transition of CLK, register 206 will cause the signal on line 48 to transition to a low logic state or become inactive at time t7.

After the signal on line 48 has transitioned to a low logic state at time t7, driver 210 will be disabled from driving data onto bi-directional bus 52 at time t8. The difference between times t7 and t8 includes the time required for the signal on line 48 to travel to driver 210 and receiver 212, time required to disable driver 210, and time required to enable receiver 212.

When the signal on line 48 transitions to a low logic state, AND gate 204 transitions the signal on line 44 to a high logic state (not shown). On the next rising edge of CLK on line 46, register 208 will cause the signal on line 50 to transition to a high logic state or become active at time t9. At time t10, driver 214 will then be enabled to drive bi-directional bus 52. The difference between times t9 and t10 includes the intrinsic delay of system 200. The intrinsic delay of system 200 includes the time required for the signal on line 50 to travel from the Q output of register 208 to input/output circuitry 34, the time required to enable driver 214 to drive bi-directional bus 52, and time required to disable receiver 216 from receiving data from bi-directional bus 52.

It will be appreciated by one of ordinary skill in the art that anticontention circuitry 28 may comprise different circuit elements which achieve the same function as AND gates 202 and 204. For one embodiment, AND gate 204 may be a NOR gate. For another embodiment, AND gate 202 may be replaced by an AND gate having no active low inputs, and AND gate 204 may be replaced with an OR gate having no active low inputs.

It will also be appreciated by one of ordinary skill in the art that the active and inactive logic states for the driver select signal on line 36, the signal on line 48, and the signal on line 50 may be changed and the circuit elements of anticontention circuitry 28 altered accordingly. For example, if driver 214 is enabled when the signal on line 50 is low and the select signal on line 36 is low, and driver 210 is enabled when the signal on line 48 is high, then AND gate 202 may be replaced with an AND gate having no active low inputs, and AND gate 204 may be replaced with a NOR gate having no active low inputs.

The embodiment illustrated in FIG. 2 may altered so that neither first device 20 nor second device 22 drives data onto bi-directional bus 52 at a given time. For one embodiment, a tri-state control signal may be applied to an additional input of each of AND gates 202 and 204. For another embodiment, additional AND gates may be coupled to lines 48 and 50. For example, an AND gate having two inputs may be coupled to line 48. One input of the AND gate would receive the signal on line 48 and the other input of the AND gate would receive a tri-state control signal. The output of the AND gate would then be coupled to driver 210 and receiver 212. A similar configuration may also be coupled to line 50.

Registers 206 and 208 are D-type registers which clock data on the D inputs to the Q outputs in response to a rising edge transition of CLK on line 46. For one embodiment, registers 206 and 208 may be configured to transition off the falling edge of CLK as generally known in the art. For another embodiment, registers 206 and 208 may be designed to each transition off a different clock edge of CLK.

Figure 4:
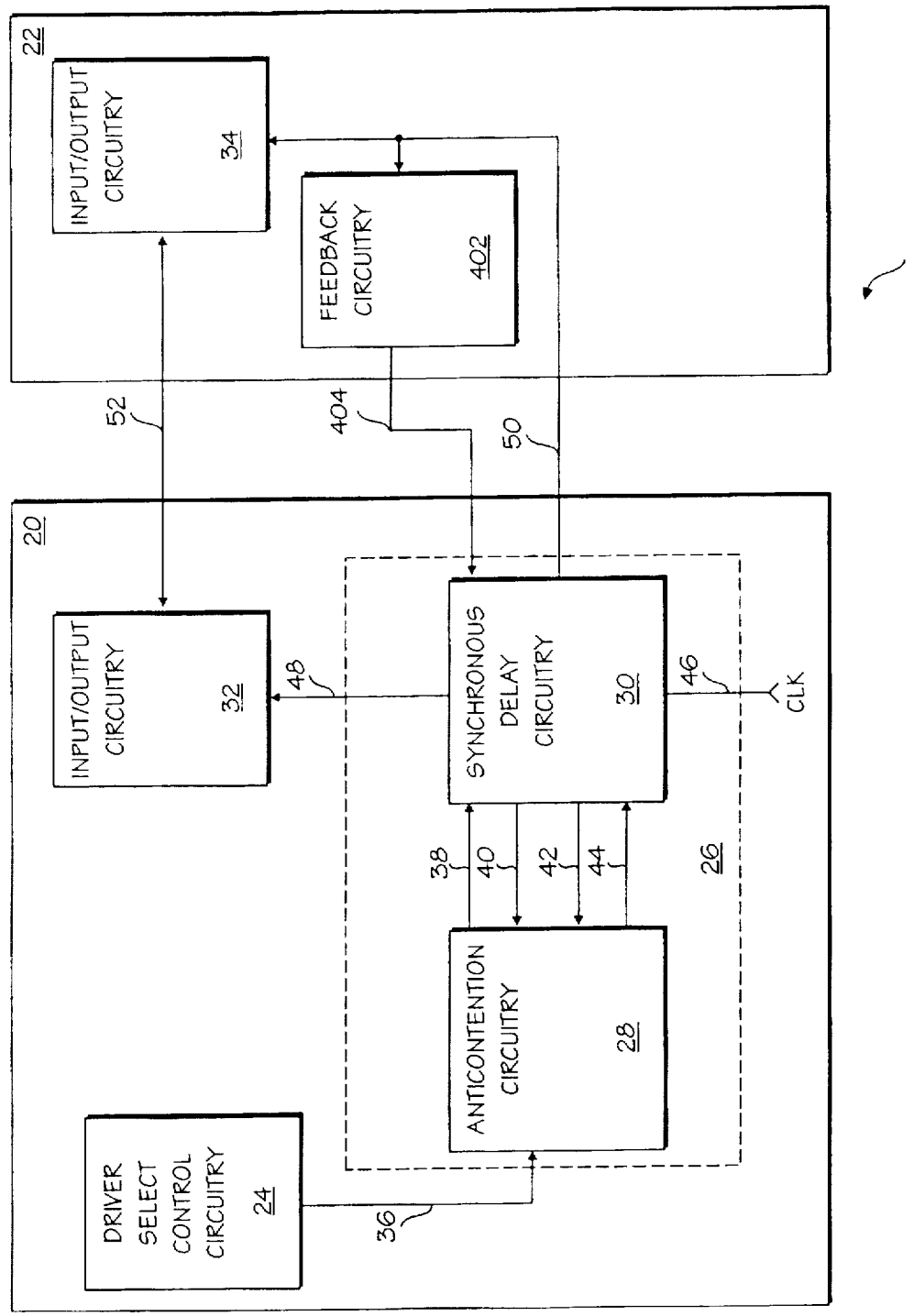
FIG. 4 is a block diagram of an embodiment of the present invention including feedback circuitry.

FIG. 4 illustrates system 400 which is another embodiment of system 10 illustrated in FIG. 1. Second device 22 includes feedback circuitry 402 coupled to line 50 and line 404. Feedback circuitry 402 couples the signal on line 50 back to synchronous delay circuitry 30 and synchronous anticontention circuitry 26 on line 404.

In this embodiment, first device 20 and second device 22 each have one output and one input to accommodate bus arbitration. The output of first device 20 outputs the signal on line 50 to the input of second device 22. The output of second device 22 outputs the feedback signal on line 404 to the input of first device 20.

Synchronous anticontention circuitry 26 prevents contention on bi-directional bus 52 with the aide of feedback circuitry 402 as follows. Assume that driver select control circuitry 24 has generated a driver select signal line on line 36 having a first logic state for a period of time so that input/output circuitry 34 controls bi-directional bus 52. At a later point in time, driver select control circuitry 24 determines that input/output circuitry 32 should have access to and drive data on bi-directional bus 52.

Driver select control circuitry 24 transitions the driver select signal on line 36 to a second logic state. Anticontention circuitry 28 then generates a signal on line 44. In response to a first transition of a clock signal CLK on line 46 and the signal on line 44, synchronous delay circuitry 30 sends a signal on line 50 to input/output circuitry 34 that disables input/output circuitry 34 from driving data onto bi-directional bus 34.

As previously described, it will take a certain amount of time for the signal on line 50 to travel across line 50 and to disable input/output circuitry 34 from driving data onto bi-directional bus 52. This is the intrinsic delay of system 400. Feedback circuitry 402 is a means for compensating for the intrinsic delay of system 400.

After the signal on line 50 has traveled from synchronous delay circuitry 30 to second device 22, the signal is fed back to synchronous delay circuitry 30 by feedback circuitry 402. Synchronous delay circuitry 30 then generates a signal on line 42. For one embodiment, the signal on line 42 is the signal on line 50 asynchronously delayed by feedback circuitry 402. For another embodiment, logic and circuit elements within synchronous delay circuitry 30 may generate the signal on line 42 in response to the signal on line 50 delayed by feedback circuitry 402 and the clock signal on line 46.

Anticontention circuitry 28 then generates a signal on line 38 based on the signal on line 42 and the driver select signal on line 36. In response to a second or subsequent transition of CLK on line 46, synchronous delay circuitry 30 generates a signal on line 48 that enables input/output circuitry 32 to drive data onto bi-directional bus 52.

In contrast to the embodiment illustrated in FIG. 2, the time between the first and second transitions of CLK does not have to be greater than the intrinsic delay of system 400. This is because synchronous delay circuitry 30 will not generate the signal on line 42 in response to a transition of CLK on line 46 until it receives the signal from line 50 fed back by feedback circuitry 402 on line 404.

When driver select control circuitry determines that input/output circuitry 34 should again drive data onto bi-directional bus 52, driver select control circuitry 24 transitions the driver select signal on line 36 from the second logic state to the first logic state. Anticontention circuitry 28 then generates a signal on line 38. In response to a first transition of a clock signal CLK on line 46 and the signal on line 38, synchronous delay circuitry 30 sends a signal on line 48 to input/output circuitry 32 that disables input/output circuitry 32 from driving data onto bi-directional bus 52.

When input/output circuitry 32 has been disabled from driving data onto bi-directional bus 34, neither input/output circuitry 32 nor input/output circuitry 34 drives data onto bi-directional bus 52. Synchronous delay circuitry 30 then generates a signal on line 40. For one embodiment, the signal on line 40 is the signal on line 48. For another embodiment, logic and circuit elements within synchronous delay circuitry 30 may generate the signal on line 40 in response to the signal on line 38 and the clock signal on line 46.

Anticontention circuitry 28 generates a signal on line 44 in response to the signal on line 40 and the driver select signal on line 36. In response to a second transition of CLK on line 46, synchronous delay circuitry 30 generates a signal on line 50 that enables input/output circuitry 34 to drive data onto bi-directional bus 52.

It will be appreciated by one skilled in the art that the function of lines 38 and 44 are interchangeable. Similarly, the function of lines 40 and 42 are interchangeable.

Figure 5:
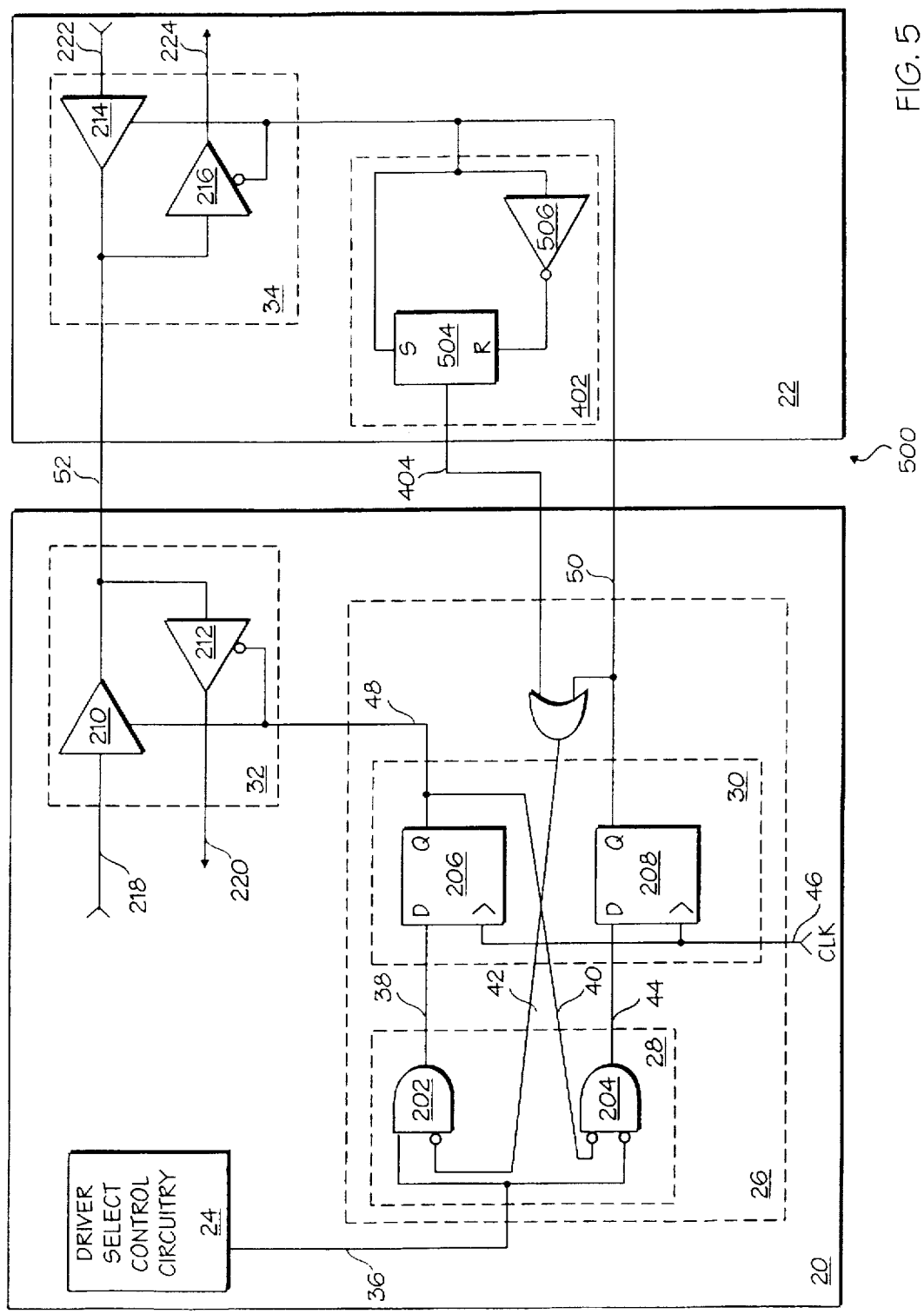
FIG. 5 is a circuit diagram of another embodiment of the present invention including feedback circuitry.

FIG. 5 illustrates system 500 which is one embodiment for the synchronous contention prevention circuitry illustrated in FIG. 4. System 500 is the embodiment illustrated in FIG. 2 with the addition of feedback circuitry 402.

Feedback circuitry 402 includes a buffer which comprises SR register 504 and inverter 506. The S input of SR register 504 and the input of inverter 506 are coupled to line 50. The output of inverter 506 is coupled to the R input of SR register 504. The output of SR register 504 is coupled to one input of OR gate 502 via line 404. The other input of OR gate 502 is coupled to line 50. The output of OR gate 502 is coupled to the active low input of AND gate 202 via line 42. OR gate 502 may be a part of feedback circuitry 402 or a part of synchronous anticontention circuitry 26 as illustrated in FIG. 3.

The output of the SR register 504 provides sufficient drive capability to drive line 404 and reduces undesirable transmission line effects on line 404. The undesirable transmission line effects may cause short duration transients to inadvertently upset the output of OR gate 502. SR register 504 should be designed to be reset dominant such that when a conflict occurs between the S and R inputs, the state of the R input determines the output of SR register 504. Thus, when the S and R inputs both receive a high logic state, the output of SR register 504 is a low logic state, and when the S and R inputs both receive a low logic state, the output of SR register 504 is a high logic state.

For another embodiment, feedback circuitry 402 may comprise any other type of buffer known by those generally skilled in the art, including a CMOS transmission gate, two back-to-back inverters, and n-channel or p-channel MOSFET pass gates.

For another embodiment, feedback circuitry 402 may comprise a direct connection from line 50 (within second device 22) back to one input of OR gate 502 on line 404. For yet another embodiment, OR gate 502 is not required and the output of SR register 504 is coupled to line 42 via line 404. For yet another embodiment, OR gate 502 is not required and feedback circuitry 402 comprises a direct connection from line 50 (within second device 22) back to line 42 via line 404.

Figure 6:
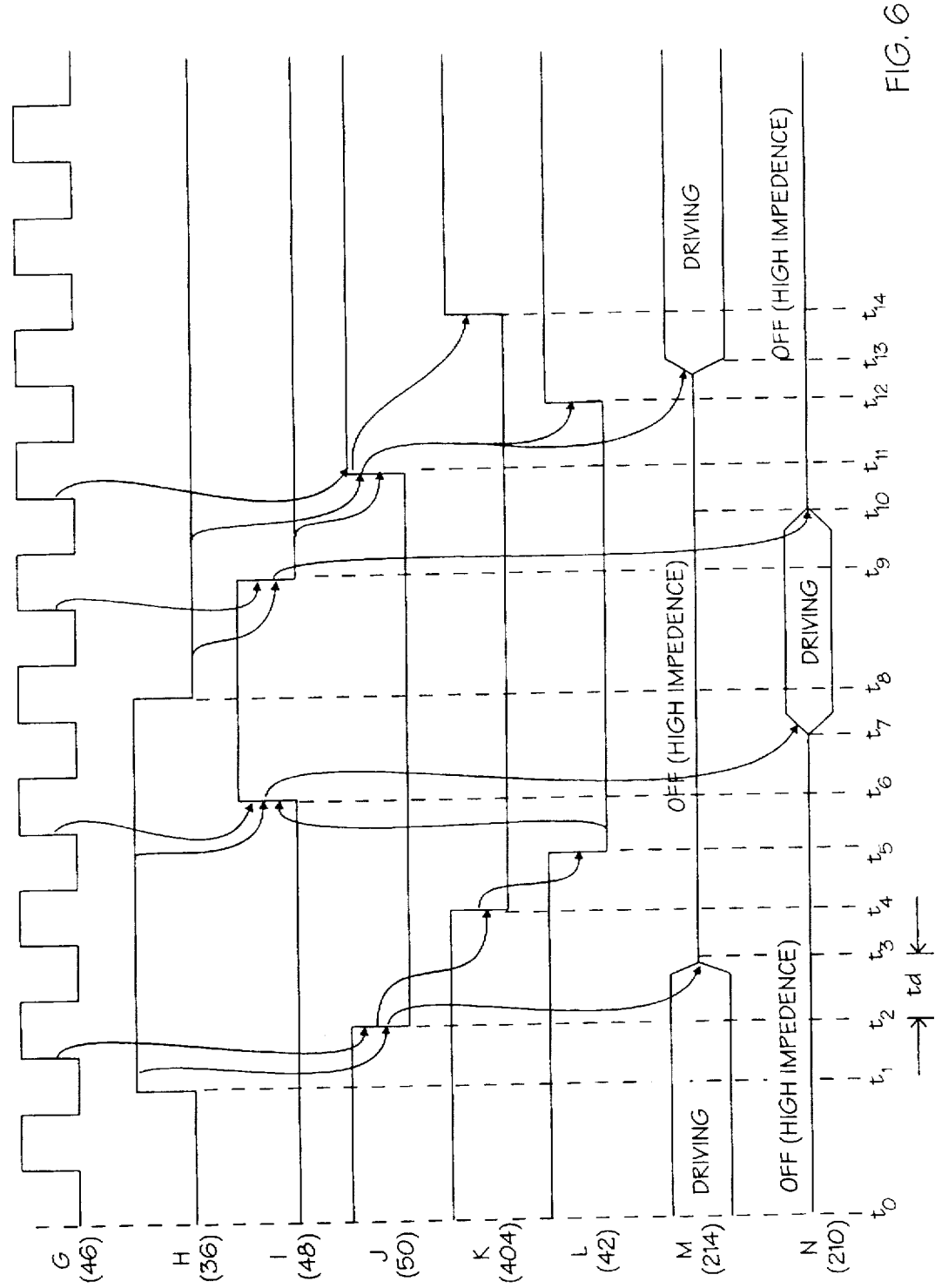
FIG. 6 is a timing waveform diagram for the embodiment of the present invention illustrated in FIG. 5.

The operation of the circuitry illustrated in FIG. 5 will be described with the aide of the illustrative timing waveform diagram shown in FIG. 6. In FIG. 6, waveform G corresponds to the signal on line 46, waveform H corresponds to the driver select signal on line 36, waveform I corresponds to the signal on line 48, waveform J corresponds to the signal on line 50, waveform K corresponds to the signal on line 404, waveform L corresponds to the signal on line 42, waveform M corresponds to the output of driver 214 driving bi-directional bus 52 (high and low levels indicate driver 214 is driving data onto bi-directional bus 52, and an intermediate level represented by a solid single line indicates that driver 214 is not driving bi-directional bus 52 and is in a high impedance state), and waveform N corresponds to the output of driver 210 driving bi-directional bus 52 (high and low levels indicate driver 210 is driving data onto bi-directional bus 52, and an intermediate level represented by a solid single line indicates that driver 210 is not driving bi-directional bus 52 and is in a high impedance state).

At time t0, driver select signal on line 36 is in a low logic state, the signals on lines 38 and 48 are low (inactive), the signals on lines 42, 44, 50, and 404 are high (active), input/output circuitry 34 is enabled to drive data onto bi-directional bus 52, and input/output circuitry 32 is disabled from driving data onto bi-directional bus 52.

At some point in time after time t0, driver select control circuitry 24 will communicate to synchronous anticontention circuitry 26 that input/output circuitry 32 should have control of bi-directional bus 52. At time t1, driver select control circuitry 24 transitions the driver select signal on line 36 to a high logic state. This will cause the signal on line 44 to transition from a high logic state to a low logic state (not shown). On the next rising edge transition of CLK, register 208 will cause the signal on line 50 to transition to a low logic state or become inactive at time t2.

After the signal on line 50 has transitioned to a low logic state at time t2, driver 214 will be disabled from driving data onto bi-directional bus 52 at time t3. The difference between times t2 and t3 includes the intrinsic delay $t_d$ of system 500. The intrinsic delay of system 500 includes the time required for the signal on line 50 to travel from the Q output of register 208 to the input/output circuitry 34, time required to disable driver 214 from driving bi-directional bus 52, and time required to enable receiver 216 to receive data from bi-directional bus 52.

When the signal on line 50 transitions to a low logic state at time t2, the transition is not immediately coupled back to AND gate 202 because feedback circuitry 402 continues to couple a feedback signal on line 404 which comprises a high logic state. The feedback signal on line 404 will transition to a low logic state at time t4 when the low logic state on line 50 travels to second device 22 and resets SR register 504.

When both inputs to OR gate 502 comprise a low logic state, then a low logic state will be coupled to the active low input of AND gate 202 at time t5. AND gate 202 then transitions the signal on line 38 to a high logic state (not shown). On the next rising edge of CLK on line 46, register 206 will cause the signal on line 48 to transition to a high logic state or become active at time t6. At time t7, driver 210 will then be enabled to drive bi-directional bus 52. The time difference between times t6 and t7 includes the time required for the signal on line 48 to travel to driver 210 and receiver 212, time required to enable driver 210, and time required to disable receiver 212.

From time t1 to time t7 synchronous anticontention circuitry 26 and feedback circuitry 402 transition control of bi-directional bus 52 from second device 22 to first device 20 while preventing bus contention between input/output circuitry 34 and input/output circuitry 32.

The timing waveform diagram in FIG. 5 illustrates that after the driver select signal on line 36 transitions from a low logic state to a high logic state, it requires three rising edge transitions of the clock signal CLK on line 46 to disable driver 214 and enable driver 210 (from time t1 to time t7). However, if the feedback path through feedback circuitry 402 is fast enough to provide the low logic state output from OR gate 502 before the second rising edge transition of CLK on line 46, then it would require only two rising edge transitions of CLK on line 46 to disable driver 214 and enable driver 210. Thus, the next rising edge of CLK after line 42 transitions to a low logic state causes line 48 to transition to a high logic state and subsequently enables driver 210 to drive bi-directional bus 52.

As further illustrated in FIG. 5, synchronous anticontention circuitry 26 and feedback circuitry 402 transition control of bi-directional bus 52 from first device 20 back to second device 22 at time t8 through time t13.

At time t8, driver select control circuitry 24 transitions the driver select signal on line 36 to a low logic state. This will cause the signal on line 38 to transition from a high logic state to a low logic state (not shown). On the next rising edge transition of CLK, register 206 will cause the signal on line 48 to transition to a low logic state or become inactive at time t9.

After the signal on line 48 has transitioned to a low logic state at time t9, driver 210 will be disabled from driving data onto bi-directional bus 52 at time t10. The difference between times t9 and t10 includes the time required for the signal on line 48 to travel to driver 210 and receiver 212, time required to disable driver 210, and time required to enable receiver 212.

When the signal on line 48 transitions to a low logic state, AND gate 204 transitions the signal on line 44 to a high logic state (not shown). On the next rising edge of CLK on line 46, register 208 will cause the signal on line 50 to transition to a high logic state or become active at time t11. At time t12, OR gate 502 transitions the signal on line 42 to a high logic state. At time t13, driver 214 is enabled to drive bi-directional bus 52. The time difference between times t11 and t13 includes the intrinsic delay of system 500. The intrinsic delay of system 500 includes the time required for the signal on line 50 to travel from the Q output of register 208 to input/output circuitry 34, time required to enable the driver 214 to drive bi-directional bus 52, and time required to disable receiver 216 from receiving data from bi-directional bus 52.

After the signal on line 50 travels to feedback circuitry 402, SR register 504 is set and outputs a high logic state on line 404 at time t14.

It will be appreciated that OR gate 502 and buffer comprising SR register 504 and inverter 506 may be replaced with other circuit components that perform a similar function without departing from the scope and spirit of the present invention. For example, feedback circuitry 402 may comprise an inverter and OR gate 502 may have an active low input coupled to line 404. For another embodiment, OR gate 502 may comprise an AND gate, an OR gate or any combination thereof.

The previous embodiments illustrated in FIGS. 1, 2, 4, and 5 may be extended to a system comprising more than two devices. Any number of device may be coupled to a bi-directional bus wherein one of the devices includes synchronous anticontention circuitry as illustrated in FIGS. 1, 2, 4, and 5.

Figure 7:
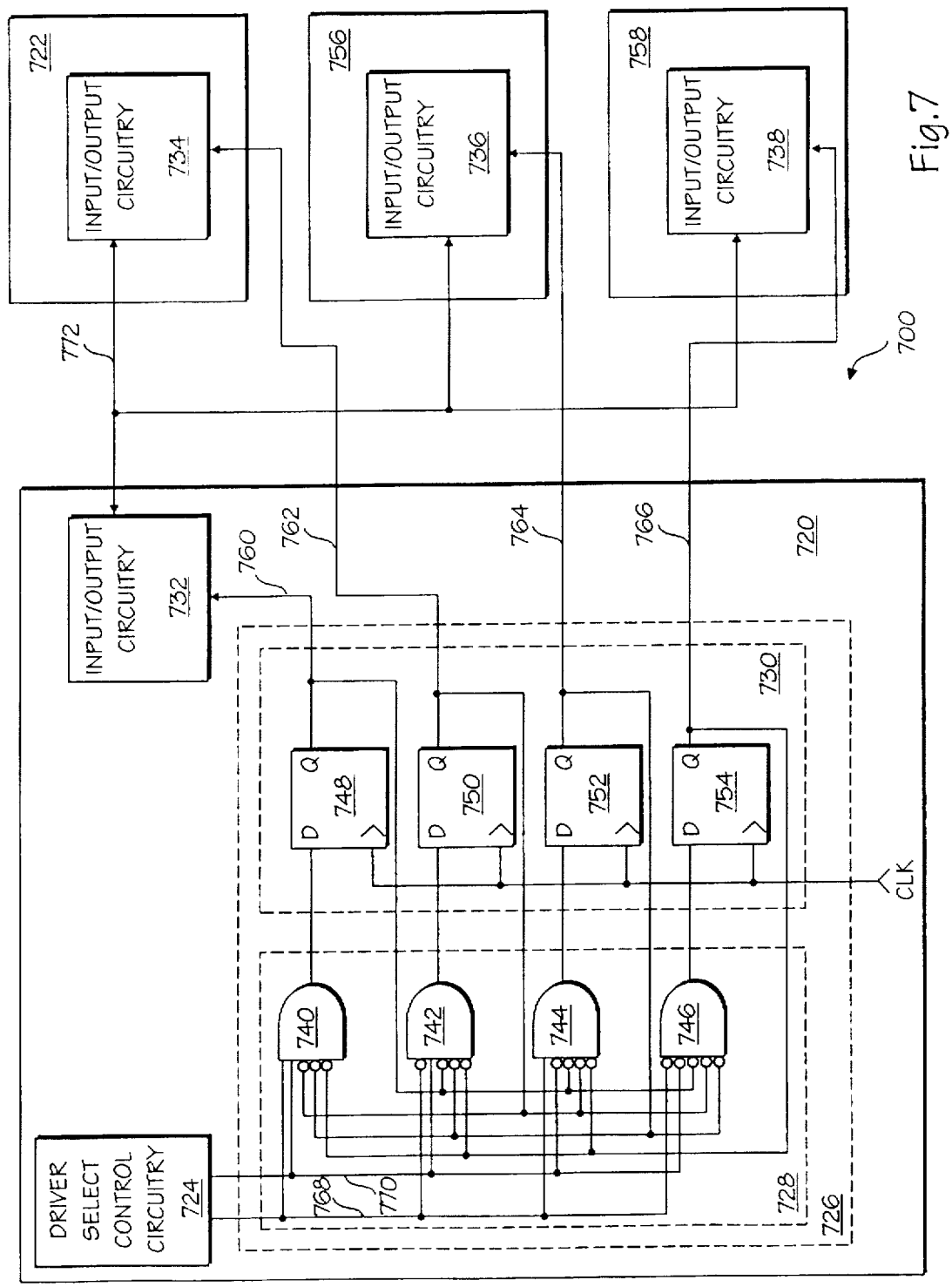
FIG. 7 is a circuit diagram of an embodiment of the present invention.

FIG. 7 illustrates one embodiment of the present invention including four devices coupled to a bi-directional bus 772. FIG. 7 shows a system 700 comprising first device 720, second device 722, third device 756, and fourth device 758 each coupled to bi-directional bus 772. Devices 720, 722, 756 and 758 may each comprise integrated circuits, discrete circuits, or systems. For one embodiment, devices 720, 722, 756 and 758 are included in a single device.

First device 720 includes synchronous anticontention circuitry 726 coupled to driver select control circuitry 724 and input/output circuitry 732. Input/output circuitry 732 is coupled to bi-directional bus 772. First device 720 also includes three outputs to accommodate bus arbitration: one output for line 762, one output for line 764, and one output for line 766.

Second device 722 includes input/output circuitry 734 coupled to bi-directional bus 772 and line 762. Third device 756 include input/output circuitry 736 coupled to bi-directional bus 772 and line 764. Fourth device 758 includes input/output circuitry 738 coupled to bi-directional bus 772 and line 766. Synchronous anticontention circuitry 726, input/output circuitry 732, input/output circuitry 734, input/output circuitry 736, and input/output circuitry 738 comprise synchronous contention prevention circuitry for bi-directional bus 772. Bi-directional bus 772 may comprise a single bi-directional line or a plurality of bi-directional lines.

Driver select control circuitry 724 comprises control circuitry that determines which of devices 720, 722, 756, or 758 should control or drive data onto bi-directional bus 772. For one embodiment, driver select control circuitry 724 may be part of a system state machine controller for system 700 or a state machine controller of first device 720. For an alternative embodiment, driver select control circuitry 724 may be circuitry which communicates with the system state machine controller or the state machine controller of first device 720.

Anticontention circuitry 728 comprises four five-input AND gates 740, 742, 744 and 746. Synchronous delay circuitry 730 comprises four D-type registers 748, 750, 752 and 754. The D inputs of registers 748, 750, 752 and 754 are coupled to the outputs of AND gates 740, 742, 74 and 746, respectively. The clock inputs of each of registers 748, 750, 752 and 756 are coupled to the clock signal CLK on line 774. The Q outputs of registers 748, 750, 752 and 754 are coupled to line 760, 762, 764 and 766, respectively. The Q output of register 748 is coupled to an active low input of each of AND gates 742, 744 and 746. The Q output of register 750 is coupled to an active low input of each of AND gates 740, 744 and 746. The Q output of register 752 is coupled to an active low input of each of AND gates 740, 742 and 746. The Q output of register 754 is coupled to an active low input of each of AND gates 740, 742 and 744.

Driver select control circuitry 724 generates two driver select signals and couples the driver select signals to synchronous anticontention circuitry 726 via lines 768 and 770. The driver select signals indicate which device may drive data onto bi-directional bus 772. For example, when the driver select signals each comprise a low logic state, synchronous anticontention circuitry 726 sends a signal on line 766 to input/output circuitry 738 which enables input/output circuitry 738 to drive data onto bi-directional bus 772. When the driver select signals each comprise a high logic state synchronous anticontention circuitry 726 sends a signal on line 760 to input/output circuitry 732 which enables input/output circuitry 732 to drive data onto bi-directional bus 772. When the driver select signals comprise a low logic state and a high logic state on line 768 and 770, respectively, synchronous anticontention circuitry 726 sends a signal on line 762 to input/output circuitry 734 which enables input/output circuitry 734 to drive data onto bi-directional bus 772. When the driver select signals comprise a high logic state and a low logic state on lines 768 and 770, respectively, synchronous anticontention circuitry 726 sends a signal on line 764 to input/output circuitry 736 which enables input/output circuitry 736 to drive data onto bi-directional bus 772.

The embodiment of FIG. 7 functions in a similar manner as the embodiment illustrated in FIG. 2. For one example, assume that driver select control circuitry 724 is generating low logic states on each of line 768 and 770, the signal on line 766 is in a high logic state, and input/output circuitry 738 is driving data on bi-directional bus 772. At some point later in time, driver select control circuitry 724 determines that input/output circuitry 732 should drive bi-directional bus 772. Driver select control circuitry generates two high logic state on line 768 and 770 which causes the output of AND gate 746 to transition to a low logic state.

In response to the next rising edge transition of CLK, register 754 will output a low logic state on line 766 which will disable input/output circuitry 738 from driving bi-directional bus 772 after an intrinsic delay of system 700 associated with register 754, line 766, and input/output circuitry 738. It will be appreciated that register 750, line 762, and input/output circuitry 734 also has an intrinsic delay. Additionally, register 752, line 764, and input/output circuitry 736 has an intrinsic delay. These various intrinsic delays of system 700 may be the same or different. One of ordinary skill in the art will appreciate that the clock period $t_{CLK}$ must be greater than the longest of the various intrinsic delays of system 700.

The low logic state on line 766 will then be coupled to AND gates 740, 742 and 744. This will cause AND gate 740 to output a high logic state to register 748. In response to the next rising edge transition of CLK, register 748 will output a high logic state on line 760 which will enable input/output circuitry 732 to drive bi-directional bus 772.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A synchronous contention prevention circuit comprising:

a synchronous anticontention circuit receiving a driver select signal and a clock signal; and a first input/output circuit having a first input coupled to the synchronous anticontention circuit and a first output, wherein:

when the driver select signal is in a first logic state, the first input/output circuit is disabled from driving the first output;

when the driver select signal transitions from the first logic state to a second logic state, the synchronous anticontention circuit generates:

(a) a first signal in response to a first transition of the clock signal; and (b) a second signal in response to the first signal and a second transition of the clock signal, wherein the second signal enables the first input/output circuit to drive the first output.

2. The synchronous contention prevention circuit of claim 1, wherein the first output is for coupling to a bi-directional bus.

3. The synchronous contention prevention circuit of claim 1, wherein the synchronous anticontention circuit comprises:

an anticontention circuit having an input receiving the driver select signal; and a synchronous delay circuit coupled to the anticontention circuit and receiving the clock signal, wherein:

when the driver select signal transitions from the first logic state to the second logic state, the anticontention circuit generates the first signal and the synchronous delay circuit outputs the first signal in response to the first transition of the clock signal;

in response to the first signal, the anticontention circuit generates the second signal; and in response to the second transition of the clock signal, the synchronous delay circuit outputs the second signal to the first input/output circuit.

4. The synchronous contention prevention circuit of claim 3, wherein the anticontention circuit comprises:

a first logic element receiving the driver select signal and the first signal, the first logic element having an output coupled to the synchronous delay circuit; and a second logic element receiving the driver select signal and the second signal, the second logic element having an output coupled to the synchronous delay circuit.

5. The synchronous contention prevention circuit of claim 3, wherein the synchronous delay circuit comprises:

a first register receiving the first signal from the anticontention circuit and outputting the first signal in response to the first transition of the clock signal; and a second register receiving the second signal from the anticontention circuit and outputting the second signal in response to the second transition of the clock signal.

6. The synchronous contention prevention circuit of claim 1, further comprising a driver select control circuit coupled to the synchronous anticontention circuit, the driver select control circuit generating the driver select signal.

7. The synchronous contention prevention circuit of claim 1, further comprising a second input/output circuit having a second input coupled to the synchronous anticontention circuit and a second output, wherein:

when the driver select signal is in the first logic state, the second input/output circuit drives the second output; and when the synchronous anticontention circuit generates the first signal in response to the first transition of the clock signal the second input/output circuit is disabled from driving the second output.

8. The synchronous contention prevention circuit of claim 7, further comprising a bi-directional bus coupled to the first output of the first input/output circuit and the second output of the second input/output circuit, wherein:

when the driver select signal is in the first logic state:

(a) the second output of the second input/output circuit drives the bi-directional bus; and (b) the first output of the first input/output circuit is disabled from driving the bi-directional bus;

when synchronous anticontention circuit generates the second signal, the first output of the first input/output circuit drives the bi-directional bus.

9. The synchronous contention prevention circuit of claim 1, further comprising a feedback circuit coupled to the first signal, wherein the feedback circuit couples the first signal back to the synchronous anticontention circuit.

10. The synchronous contention prevention circuit of claim 9, wherein the feedback circuit comprises a buffer.

11. The synchronous contention prevention circuit of claim 10, wherein the buffer comprises:

an SR register having an S input, an R input, and an output, wherein the S input and the output of the SR register are coupled to the first signal and synchronous anticontention circuit, respectively; and an inverter having an input and an output, wherein the input of the inverter is coupled to the S input of the SR register and the first signal, and the output of the inverter is coupled to the R input of the SR register.

12. The synchronous contention prevention circuit of claim 10, wherein the feedback circuit further comprises a logic element having a first input, a second input, and an output, the first input receiving the first signal, the second input coupled to the buffer, and the output of the logic element coupled to the synchronous anticontention circuit.

13. The synchronous contention prevention circuit of claim 12, wherein the logic element comprises an AND gate, an OR gate, or any combination thereof.

14. A system comprising:

a first device including the synchronous contention prevention circuit of claim 1;

a second device comprising a second input/output circuit having a second input coupled to the synchronous anticontention circuit and a second output; and a bi-directional bus coupled to the first output of the first input/output circuit and the second output of the second input/output circuit, wherein:

when the driver select signal is in the first logic state:

(a) the second output of the second input/output circuit drives the bi-directional bus; and (b) the first output of the first input/output circuit is disabled from driving the bi-directional bus;

when the synchronous anticontention circuit generates the first signal, the second output is disabled from driving the bi-directional bus; and when the synchronous anticontention circuit generates the second signal, the first output of the first input/output circuit drives the bi-directional bus.

15. The system of claim 14, further comprising a driver select circuit coupled to the synchronous anticontention circuit, wherein the driver select circuit generates the driver select signal.

16. The system of claim 14, wherein the second device further comprises a feedback circuit having an input receiving the first signal and an output coupled to the synchronous anticontention circuit.

17. A synchronous contention prevention circuit comprising:

means for receiving a driver select signal and a clock signal;

means for generating a first signal in response to a transition of the driver select signal and a first transition of the clock signal;

means for generating a second signal in response to the first signal and a second transition of the clock signal; and first input/output means having a first input and a first output, the first input/output means for disabling driving of the first output when the driver select signal is in a first logic state, and the first input/output means for driving the first output in response to the second signal.

18. The synchronous contention prevention circuit of claim 17, further comprising second input/output means having a second input and a second output, the second input/output means for driving the second output when the driver select signal is in the first logic state, and the second input/output means for disabling driving of the second output in response to the first signal.

19. A method of synchronously preventing contention on a bi-directional bus, the method comprising the steps of:

disabling a first input/output circuit from driving a bi-directional bus in response to a first signal and a first transition of a clock signal, wherein the first signal is generated in response to a first driver select signal; and enabling a second input/output circuit to drive the bi-directional bus in response to a second signal and a second transition of the clock signal, wherein the second signal is generated in response to the first signal.

20. The method of claim 19, further comprising the steps of:

disabling the second input/output circuit from driving the bi-directional bus in response to a second driver select signal and a third transition of the clock signal; and enabling the first input/output circuit to drive the bi-directional bus in response to a fourth transition of the clock signal.

21. The method of claim 20, wherein the disabling step further comprises the steps of:

generating a first signal in response to the second driver select signal; and disabling the second input/output circuit in response to the first signal and the third transition of the clock signal.

22. The method of claim 21, wherein the enabling step further comprises the steps of:

generating a second signal in response to the first signal; and enabling the first input/output circuit in response to the second signal and the fourth transition of the clock signal.

23. An electrical device comprising:

an input/output circuit;

a bi-directional port coupled to the input/output circuit, the bi-directional port being capable of coupling to a bi-directional bus;

an input port coupled to the input/output circuit, the input port being capable of receiving a signal from a synchronous anticontention circuit, wherein the signal has:

(a) a first logic state enabling the input/output circuit to output data through the bi-directional port; and (b) a second logic state enabling the input/output circuit to receive input data through the bi-directional port;

a feedback circuit having an input coupled to the input port and an output; and an output port coupled to the output of the feedback circuit, wherein the feedback circuit is capable of receiving the signal from the input port and causing the output port to output the signal to the synchronous anticontention circuit.

\* \* \* \* \*